May 12, 1964

N. ORAM 3,132,625

MACHINE DIAL CONTROL

Filed May 11, 1961

Norman Oram
INVENTOR.

BY *Clarence A. O'Brien*
and *Harvey B. Jacobson*
Attorneys

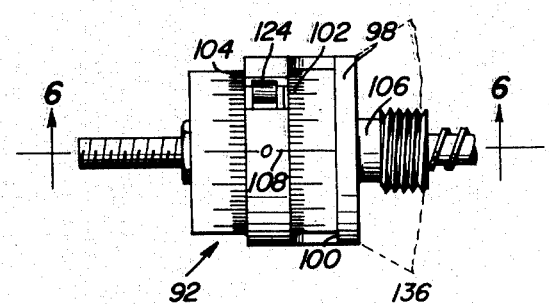
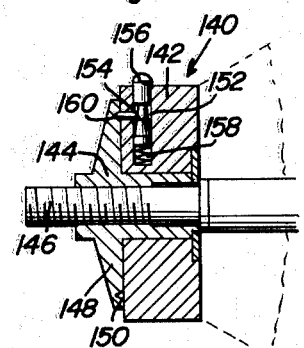
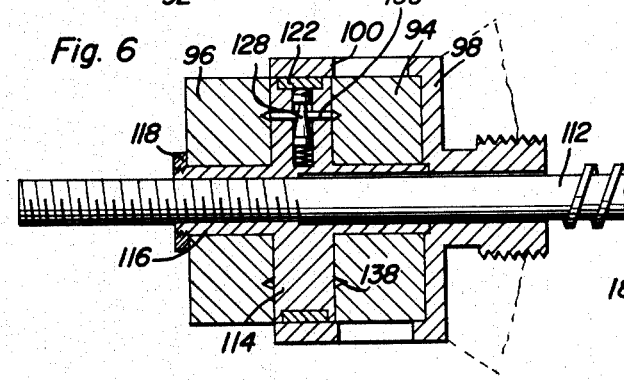
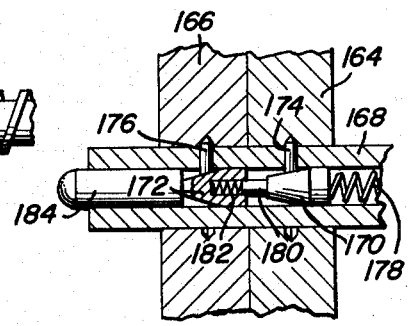
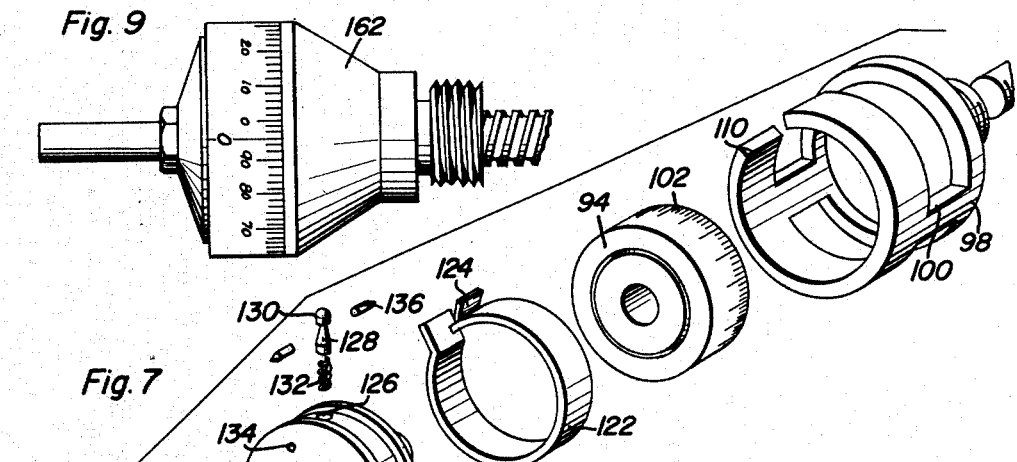
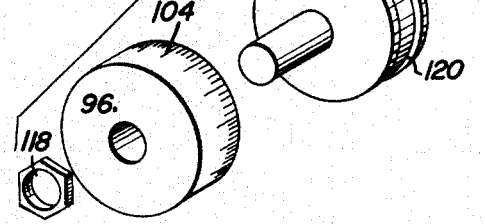

: 
United States Patent Office 3,132,625
Patented May 12, 1964

3,132,625
MACHINE DIAL CONTROL
Norman Oram, Rte. 1, Devils Lake, N. Dak.
Filed May 11, 1961, Ser. No. 109,346
11 Claims. (Cl. 116—115.5)

This invention relates in general to machine tools and more particularly to an improved machine dial control for a movable dial of a machine tool and more particularly is an improvement on prior Patent No. 2,868,154 issued January 13, 1959.

Various machine tools are provided with feed screws and there is usually provided an indicating dial on the feed screw which may be set relative to an index line on the machine tool. Ordinarily, this indicating dial is retained in position by means of a setscrew or frictional engagement. When provided with a setscrew such as an Allen setscrew, it is necessary for the operator to loosen the setscrew, rotate the dial to the desired position and then retighten the setscrew in order to change the indicating dial. This is not only time consuming but quite often, the setscrew is in an inaccessible position and is objectionable especially when a number of changes have to be made in the indicating dial position. Also, the feed screw may accidentally be moved while making such a change thereby preventing an accurate setting of the indicating dial. The frictional engagement also has certain objections since it is not dependable to retain the original setting and thus is somewhat inaccurate. In view of the objections to the setscrew arrangement and the frictional locking arrangement, the primary object of the present invention is to provide a machine dial control which may be easily operated and which retains the indicating dial in a desired position for retaining the accuracy of the setting.

Another object of the present invention is to provide a machine dial control which may be incorporated into existing machine tools without any modification of the feed screw whatsoever.

A further important object of the present invention is to provide a machine dial control which may be employed for controlling a multiple of indicating dials located on the feed screw with the dials and the operating mechanism for the lock being distinguishably colored so that the proper lock mechanism may be released in order to vary the setting of the dial.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is a top plan view on a reduced scale of a modified form of the present invention;

FIGURE 6 is an enlarged longitudinal, vertical sectional view taken substantially upon a plane passing along section line 6—6 of FIGURE 5 illustrating the structural details of this form of the invention;

FIGURE 7 is an exploded group perspective view of the construction of FIGURE 5 illustrating the relationship of the components thereof;

FIGURE 8 is a longitudinal sectional view illustrating a modified form of the invention employing a single locking mechanism;

FIGURE 9 is a top plan view of another form of the invention;

FIGURE 10 is a detailed sectional view illustrating a double-dial lock assembly.

Figure 1:
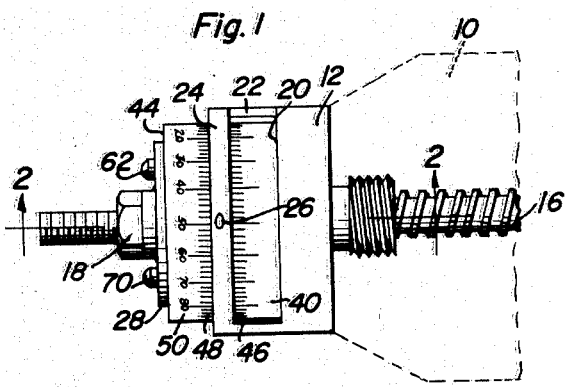
FIGURE 1 is a top plan view of the machine dial control of the present invention associated with a feed screw.

Referring now specifically to the drawings, it is pointed out that the machine dial control may be utilized on any type of machine tool having a feed screw and an indicating dial thereon. As an example, the control may be used on the cross feed of a lathe or milling machine or any similar type of machine tool. Such a feed screw would include a housing 10 having a journal 12 at one end thereof through which the feed screw 16 extends and is journaled. One end of the feed screw 16 is provided with a nut 18 and any suitable means may be provided for rotating the feed screw such as a manual crank or the like. The journal 12 is provided with a pair of arcuately elongated slots 20 which are connected with the main body of the journal 12 by axial members 22 and the outer edges of the slots 20 are defined by an annular ring 24 which is provided with an index line 26 thereon. The index line 26 is generally disposed centrally of the ends of one of the slots 20.

Figure 3:
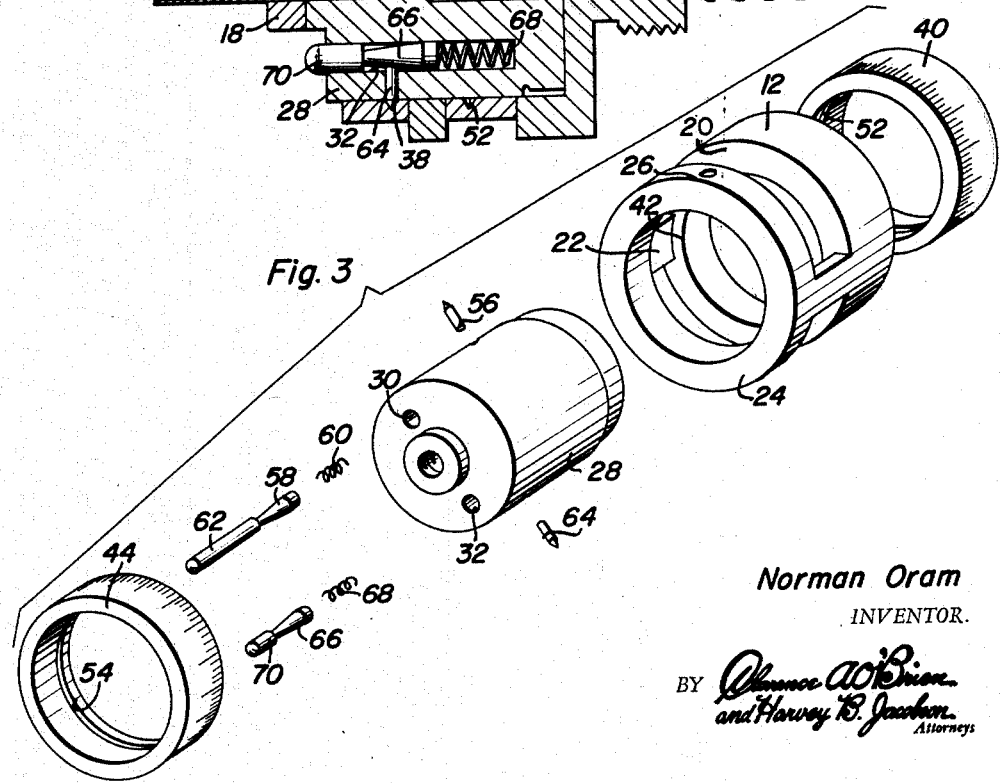
FIGURE 3 is an exploded group perspective view of the construction of FIGURE 1 illustrating the relationship of the component parts.

Mounted on the feed screw 16 is a body or housing 28 having a pair of longitudinal bores 30 and 32 which are spaced radially from a central longitudinal bore 34 which receives the feed screw 16. The bore 30 is longer than the bore 32 and is in communication with a radial bore 36 which extends to the exterior periphery of the body 28 in alignment with the slots 20. The bore 32 is provided with a radial bore 38 which communicates with the exterior surface of the body 28 axially outwardly of the annular ring 24. Encircling the body 28 in alignment with the slots 20 is an annular ring or dial member 40 which has a radial depth less than the depth of the slots 20 and which is received in the recesses 42 (see FIG. 3) in the axial members 22 thereby enabling relative rotation between the dial member 40 and the journal 12 and the index line 26 thereon.

Disposed outwardly of the annular ring 24 and in enclosing relation to the radial bore 38 is a dial member 44 in the form of an annular ring which is disposed alongside of the annular ring 24. The dial member 40 is provided with graduations 46 thereon and the dial member 44 is provided with graduations 48 thereon together with numerical indicia 50. The annular dial member 40 is provided with a V-shaped groove 52 extending about the inner surface thereof and the annular dial member 44 is provided with a similar V-shaped groove 54 extending about the inner surface thereof. The V-shaped groove 52 is in alignment with the radial bore 36 and the V-shaped groove 54 is in alignment with the radial bore 38.

Figure 2:
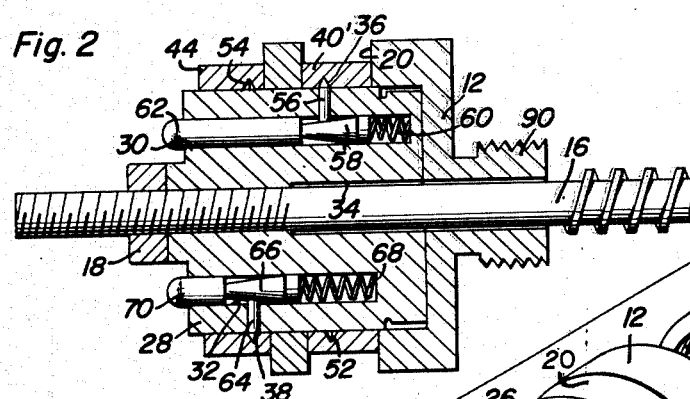
FIGURE 2 is an enlarged longitudinal, vertical sectional view taken substantially upon a plane passing along section line 2—2 of FIGURE 1 illustrating the details of construction of the present invention.

Disposed in the radial bore 36 is a radially slidable lock pin 56 having a tapered outer end for engagement in the V-shaped groove 52. The inner end of the lock pin 56 is in sliding engagement with a conical cam member 58 which is longitudinally slidable in the bore 30. A compression coil spring 60 is disposed between the bottom of the bore 30 and the inner end of the cam 58 for urging the cam 58 longitudinally outwardly which causes the pin 56 to move outwardly into frictional locking contact with the groove 52 on the annular dial 40. The cam 58 is provided with an elongated extension 62 extending axially outwardly from the bore 30 and from the surface of the body 28 thus forming an operating mechanism for forcing the cam 58 inwardly thus releasing the lock pin 56 in a manner clearly illustrated in FIGURE 2.

Radial bore 38 is provided with a movable lock pin 64 similar to the lock pin 56 and the lock pin 64 is in engagement with a cam member 66 having a spring 68 engaging one end thereof and having an extension 70 extending outwardly of the bore 32 and outwardly of the end of the body 28 whereby inward movement of the extension 70 serves to release the lock pin 64 from the groove 54 thereby unlocking the annular dial member 44. By manipulating the operating extensions 62 and 70 in an obvious manner, the dial members 40 and 44 may be rotated and set at any predetermined position and locked in this position by the cam members 58 and 66 engaging the lock pins 56 and 64 in an obvious manner.

Figure 4:
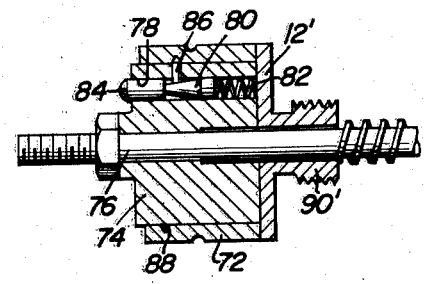
FIGURE 4 is a sectional view illustrating the use of only a single locking mechanism for a single dial control.

FIGURE 4 is similar to the construction illustrated in FIGURE 1 except that the journal 12′ is in the form of a flat circular disk and there is a single cylindrical or annular dial member 72 encircling the body 74 which receives the machine screw 76. The body 74 is provided with a lonigtudinal bore 78 offset from the center thereof which in turn receives a cam member 80, a compression spring 82 and an operating member 84 similar to the operating member 62. The conical cam 80 is engaged with a radially movable lock pin 86 having a pointed end engageable with a peripheral V-shaped groove 88 in the dial member 72 whereby the dial member 72 may be selectively locked and released by operating the operating member 84 in an obvious manner.

When it is desired to set the indicating dials 40 or 44, it is only necessary to move the corresponding operating members 62 and 70 inwardly thus enabling the indicating members to be rotated to a desired relation in relation to the index line 26. Then by merely releasing the operating members 62 and 70, the dial members 40 and 44 are securely locked in adjusted position. Provision may be made for orientating the index line 26 on the same level as graduations 46 and 48 on dial members 40 and 44. This is accomplished by providing a notch in ring 24 having a bottom surface with the index line 26 thereon with the bottom surface, index line and dial members being all on the same level. In the case of FIGURE 4, the single indicating dial member 72 may be adjusted in an obvious manner by manipulating the operating member 84. Also, in each instance, the journal which receives the feed screw may be mounted on the housing 10, in any suitable manner such as by a screw threaded adapter 90.

This assembly enables the dial control to be mounted on various machines without modification of the feed screw thus reducing the over-all cost of the device and reducing the time required in assembling the device. Further, the orientation of the operating members in offset relation to the center of rotation enables more accurate and positive control thereof and also enables a multiple of dials to be controlled more readily.

FIGURES 5–7 illustrate a double dial arrangement generally designated by reference numeral 92 which includes double dial members 94 and 96 disposed within a hollow body 98 supported on the machine tool in any suitable manner and including arcuate slots 100 therein revealing a graduated scale 102 on the dial member 94. The graduated scale 104 on the dial member 96 is observable at the outer end of the body 98. The body 98 is attached to the machine tool by any suitable adapter such as member 106. Also, the body 98 is provided with an index line 108 and a longiutdinal slot or notch 110 therein disposed outwardly of the slots 100.

Extending through the body 98 is the machine tool feed screw 112 to which is attached a cylindrical disklike member 114 which includes axial extensions 116 mounting the dials 94 and 96 thereon wherein the dials are retained in position by a screw threaded nut 118 on the outer end of one of the extensions 116.

The disk 114 is provided with an annular groove 120 receiving a split ring 122 of cylindrical configuration in which the split ring is provided with a pair of outwardly extending tabs 124 on the adjacent ends for enabling the effective diameter of the ring 122 to be reduced when the tabs 124 are moved toward each other, one of the tabs 124 may engage the end of slot 110.

The disk 114 is also provided with a radial bore 126 receiving a conical cam member 128 having a rounded actuated end portion 130 together with a spring 132 disposed under the cam 128 for urging it radially outwardly. The radial bore 126 communicates with a pair of longitudinal bores 134 which slidably receive a pair of locking pins 136 having their inner ends contacting the conical cam 128 wherein the cam 128 will urge the locking pins 136 outwardly when the cam 128 moves radially outwardly. The ends of the locking pins 136 which are tapered are received in grooves 138 in the side surfaces of the dial members 94 and 96 thereby locking the dial members 94 and 96 in adjusted position in relation to the disk 114 when the cam member 128 is in outermost position. As illustrated, the rounded end or actuated end 130 of the cam 128 engages the inner surface of the spring ring 122 wherein collapse of the spring ring or a reduction in its diameter will effectively move the cam 128 inwardly thus releasing the locking pins 136 so that the dial members 94 and 96 may be adjusted in relation to the index line 108. Immediately upon release of the spring ring 122, the lock pins 136 will again lock the dial members 94 and 96 in adjusted position thereby providing an adequate dial control for indicating movement of the feed screw.

FIGURES 8 and 9 illustrate another form of the invention designated by numeral 140 which includes a dial member 142 and a body member 144 attached to the feed screw 146. The body member 144 has a circular plate 148 associated therewith and integral therewith and facing the dial member 142 and provided with a groove 150 in the face thereof which contacts the dial member 142. The dial member 142 is provided with a radial bore 152 receiving a conical cam 154 having an actuated end 156 in the form of a rounded end on the outer end thereof and a spring 158 disposed below or inwardly of the cam 154 for effectively operating a lock pin 160 extending into engagement with the groove 150 thereby frictionally locking the dial member so that it may be orientated in relation to the stationary index line on the adapter or other mechanism for mounting on the machine tool such as the adapter illustrated in FIGURE 9 and designated by reference numeral 162 and it is pointed out that this adapter may take any of various different shapes, sizes and configurations.

FIGURE 10 illustrates an arrangement in which two dial members 164 and 166 are mounted on the feed screw 168 and are provided with tandem locking cams 170 and 172 for engaging blocking pins 174 and 176. A spring 178 engages the bottom of the cam 170 and the cam 170 is provided with an axial projection 180 slidable into a socket in the cam 172 and a small spring 182 is disposed in the bottom of the socket in the cam 182. The outer end of the cam 172 is provided with an operating end portion 184 extending concentrically out of the feed screw 168 for enabling release of the locking pin 174 in an obvious manner.

While the grooves in the various forms of the invention have been disclosed as V-grooves, other shapes of grooves may be employed although the V-shaped grooves provide the most accurate setting or positioning. Also, the tip end of the lock pins may be varied in shape to conform to the configuration of the groove in which it engages. For example, the pins may have a rounded nose for engagement in a U-shaped groove.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with the feed mechanism of a machine tool having a feed screw, a housing in which said feed screw is rotatable, a pair of indicating dials rotatably carried by said feed screw, an indicating dial control including means frictionally engaging the dials to prevent relative rotation between the dials and the screw, said means including a cam assembly carried by the feed screw for frictionally interlocking the feed screw and dials, said feed screw being provided with a body attached thereto, said dials being disposed on opposite sides of said housing, a pair of axially movable lock pins carried by the body, said cam assembly being movable radially in the body for engaging both lock pins and forcing them axially outwardly into engagement with the pair of dials.

2. The structure as defined in claim 1 wherein said body is encircled by a split spring ring engaging the cam assembly whereby the spring ring may be employed for releasing the cam assembly.

3. In combination with the feed mechanism of a machine tool having a feed screw, a housing in which said feed screw is rotatable, a pair of indicating dials rotatably carried by said feed screw, an indicating dial control including means frictionally engaging the dials to prevent relative rotation between the dials and the screw, said means including a cam assembly carried by the feed screw for frictionally interlocking the feed screw and dials, a body mounted on the lock screw, said pair of dials being carried by the body in a rotatable manner, a lock pin carried by the body for engaging each of the dials for frictionally locking the dials in position, and a separate cam assembly for each lock pin, said cam assembly each including an axially spring biased cam member having an operating finger extending axially outwardly of the body.

4. In combination with the feed mechanism of a machine tool having a feed screw, a housing in which said feed screw is rotatable, a pair of indicating dials rotatably carried by said feed screw, an indicating dial control including means frictionally engaging the dials to prevent relative rotation between the dials and the screw, said means including a cam assembly carried by the feed screw for frictionally interlocking the feed screw and dials, said cam assembly including a pair of axially movable cam members spaced radially from the center of the feed screw, and a radial lock pin engaged by each cam member for frictional engagement with the dial.

5. In combination with the feed mechanism of a machine tool having a feed screw, a housing in which said feed screw is rotatable, a pair of indicating dials rotatably carried by said feed screw, an indicating dial control including means frictionally engaging the dials to prevent relative rotation between the dials and the screw, said means including a cam assembly carried by the feed screw for frictionally interlocking the feed screw and dials, said cam assembly including a pair of tandem cam members, spring means disposed between said cam members, said cam members being disposed in a longitudinal bore in the screw.

6. In combination with the feed mechanism of a machine tool having a feed screw, a housing in which said feed screw is rotatable, a pair of indicating dials rotatably carried by said feed screw, an indicating dial control including means frictionally engaging the dials to prevent relative rotation between the dials and the screw, said means including a cam assembly carried by the feed screw for frictionally interlocking the feed screw and dials, said cam assembly including a single radial cam member, a pair of axially movable lock pins engaged by said cam member for locking the pair of dials, and a spring ring for controlling said cam member.

7. A dial control device comprising a shaft having one end extending through a support bearing, a pair of dials rotatably mounted in relation to said shaft, a stationary reference mark related to said dials for indicating the degree of rotation of the shaft, and means interconnecting the shaft and dials for locking the dials to the shaft and permitting initial adjustment of the dials in relation to the shaft, said means including a radially movable lock pin for each of said dials, a cam operator for each of said lock pins, said cam operators being movable parallel to the shaft and being spaced laterally thereof, said dials enclosing the lock pins and including grooves engaged by the lock pins for frictionally retaining the dials in adjusted position in relation to the lock pins, said lock pins and operators being disposed in a housing rigidly connected with said shaft.

8. A dial control device comprising a rotatable shaft, a body mounted on said shaft for rotation therewith, at least one dial rotatably mounted in relation to said body and shaft, an index mark stationary in relation to the shaft for indicating degrees of rotation of the shaft, and means including a reciprocating lock pin carried by the body for engaging the dial for locking the dial to the body and to the shaft for rotation therewith, and cam means engageable with one end of the lock pin for forcing the lock pin into frictional engagement with the dial thereby frictionally locking the dial to the body, said cam means including a reciprocating cam member mounted in a bore within the body and including one end portion projecting therefrom for engagement by a finger for actuating the cam means, and spring means biasing the cam means in the other direction for spring biasing the lock pin into engagement with the dial for retaining the dial in frictionally locked engagement.

9. The structure as defined in claim 8 wherein said body is in the form of a longitudinal extension on the end of a screw shaft on a machine.

10. The structure as defined in claim 8 wherein said locking pin is axially movable in relation to the rotational axis of the shaft, said cam means being radially movable in the body.

11. The structure as defined in claim 8 wherein said cam means is disposed eccentrically of the shaft with the dial encircling a portion of the body and the lock pin being movable radially in the body with the cam means engaging the inner end thereof.

References Cited in the file of this patent

UNITED STATES PATENTS

| | | |
|---|---|---|
| 2,450,788 | Foster | Oct. 5, 1948 |
| 2,584,360 | Montanus | Feb. 5, 1952 |
| 2,861,536 | Polivka | Nov. 25, 1958 |
| 2,868,154 | Oram | Jan. 13, 1959 |